US012012778B2

(12) United States Patent
Sullivan

(10) Patent No.: US 12,012,778 B2
(45) Date of Patent: Jun. 18, 2024

(54) OVERHEAD LOCKING DEVICE

(71) Applicant: Hanchett Entry Systems, Inc., Phoenix, AZ (US)

(72) Inventor: Scott P. Sullivan, Peoria, AZ (US)

(73) Assignee: Hanchett Entry Systems, Inc., Phoenix, AZ (US)

(*) Notice: Subject to any disclaimer, the term of this patent is extended or adjusted under 35 U.S.C. 154(b) by 18 days.

(21) Appl. No.: 17/878,298

(22) Filed: Aug. 1, 2022

(65) Prior Publication Data

US 2022/0364389 A1 Nov. 17, 2022

Related U.S. Application Data

(63) Continuation of application No. 16/253,888, filed on Jan. 22, 2019.

(Continued)

(51) Int. Cl.

*E05B 47/02* (2006.01)
*E05B 9/02* (2006.01)

(Continued)

(52) U.S. Cl.

CPC .............. *E05B 47/023* (2013.01); *E05B 9/02* (2013.01); *E05B 9/08* (2013.01); *E05B 47/0047* (2013.01);

(Continued)

(58) Field of Classification Search

CPC ............. E05B 47/0001; E05B 47/0002; E05B 47/0005; E05B 47/0046; E05B 47/0047;

(Continued)

(56) References Cited

U.S. PATENT DOCUMENTS 4,703,960 A * 11/1987 Lense ................. E05B 47/0012 292/201
6,390,520 B1 5/2002 Holzer (Continued)

FOREIGN PATENT DOCUMENTS

WO 0028176 5/2000
WO WO-0028176 A1 * 5/2000 ......... E05B 47/0002

OTHER PUBLICATIONS

Camden Door Controls, CX-EL0950 Series Manual, CX-EL0950 Series Glass Door Strike Installation Instructions, May 29, 2015, 2 pages, Mississauga, ON Canada.

(Continued)

*Primary Examiner* — Christine M Mills
*Assistant Examiner* — Yahya Sidky
(74) *Attorney, Agent, or Firm* — Woods Oviatt Gilman LLP; Dennis B. Danella, Esq.

(57) ABSTRACT

An electric locking device for selectively locking and unlocking a door to a door frame is provided. The device comprises a housing and a keeper movably connected to the housing. The keeper includes a keeper shaft having an axis of rotation. The keeper is rotatable about the axis of rotation between first and second rotational positions, and movable between first and second directional positions relative to the lock housing. The movement between first and second directional positions is generally linear, and the axis of rotation is configured to move relative to the lock housing as the keeper moves between first and second directional positions. When the keeper is in the first rotational and directional positions, the door is secured to the door frame by the keeper. When the keeper is in the second rotational and directional positions, the door is allowed to move away from the door frame.

23 Claims, 14 Drawing Sheets

Related U.S. Application Data

(60) Provisional application No. 62/620,539, filed on Jan. 23, 2018.

(51) Int. Cl.

| | |
|---|---|
| ***E05B 9/08*** | (2006.01) |
| ***E05B 47/00*** | (2006.01) |
| ***E05B 47/06*** | (2006.01) |
| ***E05B 63/00*** | (2006.01) |
| ***E05B 65/00*** | (2006.01) |
| ***E05B 65/06*** | (2006.01) |
| ***E05B 65/08*** | (2006.01) |

(52) U.S. Cl.
CPC ...... *E05B 47/0603* (2013.01); *E05B 65/0025* (2013.01); *E05B 65/06* (2013.01); *E05B 65/0829* (2013.01); *E05B 47/0012* (2013.01); *E05B 63/0052* (2013.01)

(58) Field of Classification Search
CPC .... E05B 47/0012; E05B 47/02; E05B 47/023; E05B 47/026; E05B 47/06; E05B 47/0603; E05B 2047/0017; E05B 2047/0023; E05B 2047/0036; E05B 63/0052; E05B 65/0025; E05B 65/06; E05B 65/0835; E05B 65/0811; E05B 65/0829; E05B 65/0847; E05B 65/0858; E05B 65/108; Y10T 292/081; Y10T 292/0818; Y10T 292/0829; Y10T 292/0854; Y10T 292/0883; Y10T 292/956; Y10T 292/225; Y10T 292/696; Y10T 292/699; Y10T 292/702; Y10S 292/29
See application file for complete search history.

(56) References Cited

U.S. PATENT DOCUMENTS

| | | | | |
|---|---|---|---|---|
| 6,474,120 | B1 | 11/2002 | Wadsworth et al. | |
| 7,029,040 | B2 * | 4/2006 | Lippoldt ............. | E05B 47/0012 292/201 |
| 2009/0056395 | A1 * | 3/2009 | Uyeda ................. | E05B 47/0046 70/278.1 |
| 2017/0034274 | A1 | 11/2017 | Snodgrass | |
| 2017/0342742 | A1 * | 11/2017 | Snodgrass ............... | E05B 63/18 |

OTHER PUBLICATIONS

Sidky Yahra I., Non-Final Office Action, U.S. Appl. No. 16/253,888, dated Oct. 27, 2021, 20 pages, U.S. Patent & Trademark Office.
Sidky Yahra I., Final Office Action, U.S. Appl. No. 16/253,888, dated Apr. 27, 2022, 36 pages, U.S. Patent & Trademark Office.

* cited by examiner

OVERHEAD LOCKING DEVICE

RELATIONSHIP TO OTHER APPLICATIONS AND PATENTS

The present application is a continuation of U.S. patent application Ser. No. 16/253,888 filed on Jan. 22, 2019, which claims the benefit of U.S. Provisional Patent Application No. 62/620,539, filed Jan. 23, 2018, the contents of which are hereby incorporated by reference in their entirety.

TECHNICAL FIELD

The present invention relates to electric locking devices for securing a door to a door frame in a closed position; particularly to an overhead electric locking device that may be used in conjunction with glass doors; and more particularly, to an overhead electric locking device for framed or frameless uni-directional or bi-directional glass doors and for use with sliding glass doors.

BACKGROUND OF THE INVENTION

Electromagnetic door locking devices are widely used in diverse electronic door applications. These locks typically use electromagnets attached to the door frame in conjunction with a ferromagnetic strike plate attached to the door, to hold the door firmly closed. When the electromagnet is energized and is in contact with the strike plate, the strike plate becomes an armature for the electromagnet, thus providing a mechanism for locking the door to the frame.

However, there may be some circumstances where a strike plate cannot be mounted onto a door, or such a fixture would be unseemly. One such circumstance would be glass panel doors. Typically, when mounting a strike plate to a door, one or more fasteners are passed through holes within the door. However, if the door is a glass panel, any holes drilled therethrough for fasteners would weaken the integrity of the glass making it susceptible to breakage should sufficient force be applied to the panel. Moreover, a mounted strike plate may disrupt the decorative aesthetic in which the glass door is situated.

Thus, what is needed in the art is an electric locking device, which may be used with glass panel doors that provides desired locking properties without comprising panel integrity or requiring mounting of a strike plate to the door panel.

What is also needed in the art is a latch assembly for an electric locking device that may be interchangeably used within locking systems designed for bi-directional swing doors, inswing doors and sliding doors.

It is the principal object of the present invention to provide these and other needs.

SUMMARY OF THE INVENTION

Briefly described, the present invention is directed toward an electric locking device for selectively locking and unlocking a door to a door frame, wherein the door is pivotally coupled to the door frame. The electric locking device comprises a lock housing configured to be mounted to the door frame, wherein the lock housing includes a top wall and an open bottom opposite the top wall. The electric locking device further comprises a keeper movably connected to the housing, wherein the keeper includes a keeper shaft having a shaft axis of rotation. The keeper is rotatable about the shaft axis of rotation between a first rotational position and a second rotational position. The keeper is also movable between a first directional position and a second directional position relative to the lock housing. The movement between the first directional position and the second directional position is generally linear, wherein the shaft axis of rotation is configured to move relative to the lock housing as the keeper moves between the first directional position and the second directional position. When the keeper is in the first rotational position and the first directional position, the door is secured to the door frame by the keeper. When the keeper is in the second rotational position and the second directional position, the door is allowed to move away from the door frame.

In another aspect, an electric locking device for selectively locking and unlocking a door to a door frame is provided, wherein the door is pivotally coupled to the door frame. The electric locking device comprises a lock housing configured to be mounted to the door frame, and a keeper movably connected to the housing. The keeper includes a keeper shaft having a shaft axis of rotation. The keeper is rotatable about the shaft axis of rotation between a first rotational position and a second rotational position. The keeper is also movable between a first directional position and a second directional position relative to the lock housing. The shaft axis of rotation is configured to move relative to the lock housing as the keeper moves between the first directional position and the second directional position. When the keeper is in the first rotational position and the first directional position, the door is secured to the door frame by the keeper. When the keeper is in the second rotational position and the second directional position, the door is allowed to move away from the door frame.

In yet another aspect, a latch assembly for use within an electric locking device is provided. The assembly comprises a latch housing, a latch bolt, a blocking member, and a blocking element. The latch bolt is disposed within the latch housing and has a first end and an opposing second end. The second end is configured to be positioned in a first orientation outwardly from the latch housing and to be positioned in a second orientation inwardly of the first orientation. The blocking member has an engaged position when the latch bolt is in the first orientation and an unengaged position when the latch bolt is in the second orientation. The blocking element is coupled to the blocking member and moveable along a linear path between a blocking position and an unblocking position. The blocking member is in the engaged position when the blocking element is in the blocking position to prevent the latch bolt from moving between the first orientation and the second orientation. The blocking member is in the unengaged position when the blocking element is in the unblocking position to allow the latch bolt to move between the first orientation and the second orientation.

Numerous applications, some of which are exemplarily described below, may be implemented using the present invention.

DETAILED DESCRIPTION OF THE PREFERRED EMBODIMENT

Figure 1:
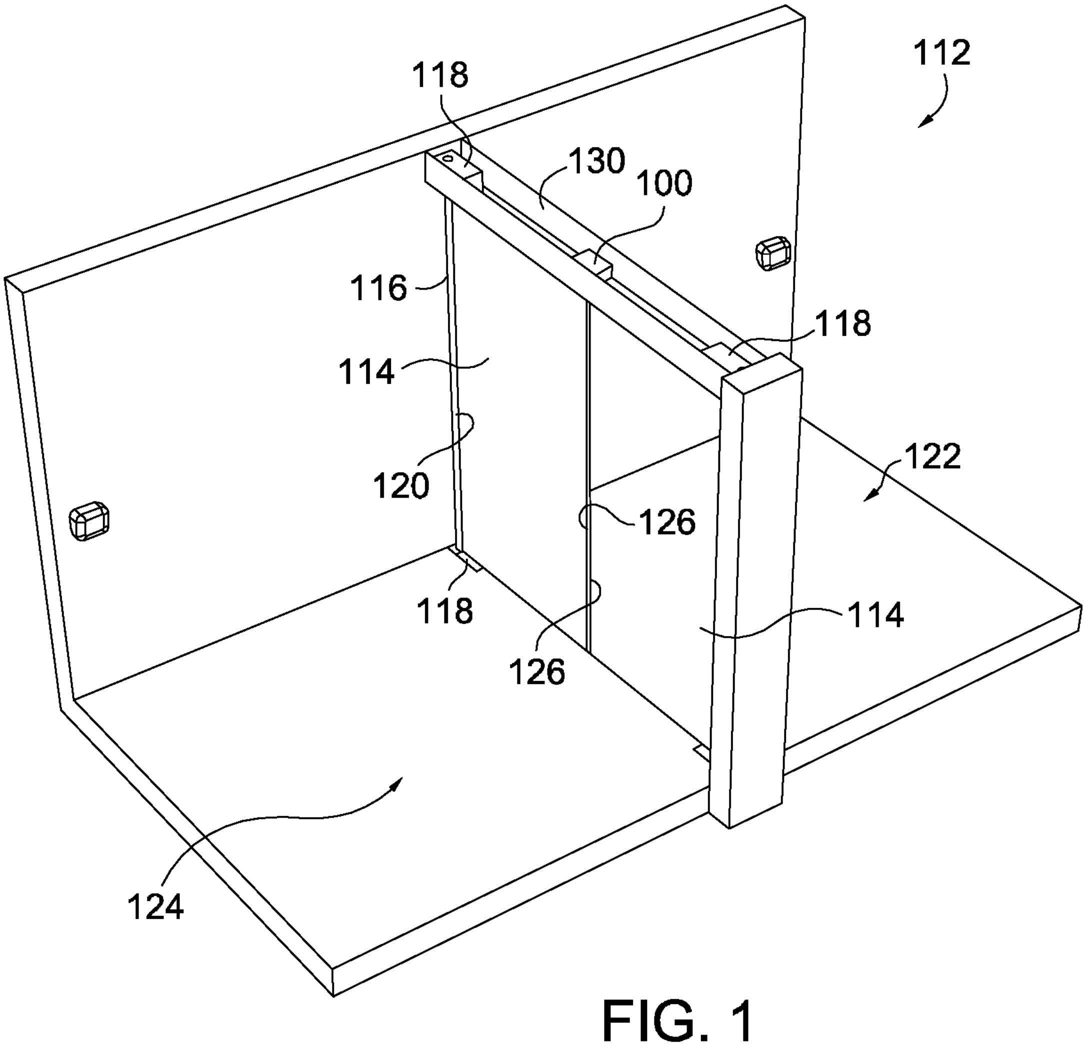
FIG. 1 is a plan view of a bi-directional door installation including an electric locking device in accordance with an aspect of the present invention.

Relative positional or directional terms used herein, such as for example, top, bottom, front, back, left side, right side, upward, downward, rightward, leftward, inward, outward, vertical, horizontal, clockwise, counterclockwise, etc., may be used to describe a positional or directional relationship among elements as the elements are presented in the drawings. However, these terms should not limit in any way a specific orientation of the referenced feature, in practice. For example, a top wall as depicted in a drawing may be thought of as a side or bottom wall if the element is oriented differently in practice.

With reference to FIGS. 1-7C, an overhead electric locking device 100 configured for use within a bi-directional door installation 112 is shown. As shown in FIG. 1, a typical bi-directional door installation may include one or more doors 114 pivotally mounted within a frame 116, such as via hinges 118 at hinge edge 120 of doors 114. Hinges 118 may permit doors 114 to be opened either inwardly (such as into open space 122) or outwardly (such as into open space 124).

Figure 4:
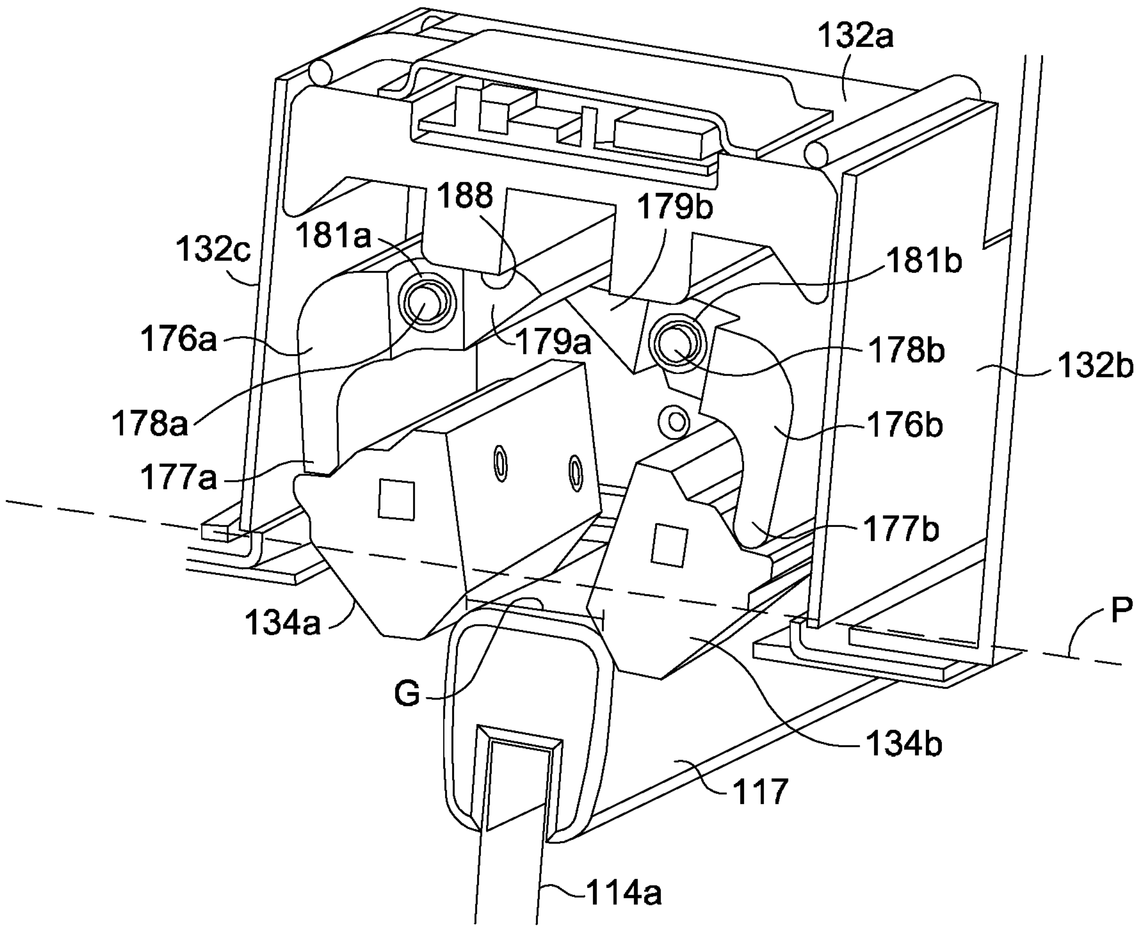
FIG. 4 is a partial cross-section view of the bi-directional door installation shown in FIG. 1.
Figure 5:
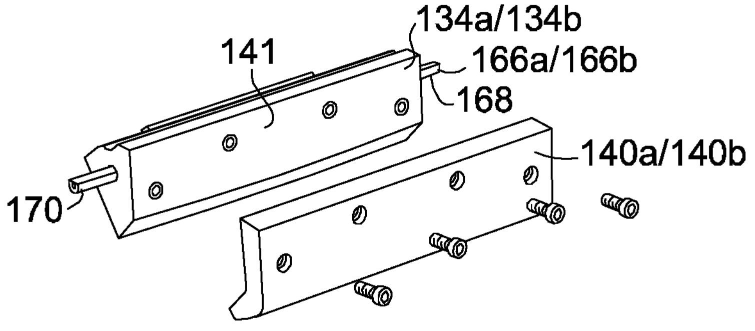
FIG. 5 is an exploded perspective view of a keeper and optional shim in accordance with an aspect of the present invention.

Electric locking device 100 may include a lock unit 128 (FIG. 2) that may be configured to be mounted above doors 114, such as within transverse upper frame member 130, proximate door latch edges 126. Lock unit 128 may generally include a lock housing 132 having a top wall 132*a* and a front wall 132*b*, back wall 132*c*, left side wall 132*d* and right side wall 132*e* defining an open bottom 133. Lock housing 132 is configured to pivotally receive a pair of keepers 134*a*, 134*b* arranged in spaced parallel relation to one another. Keepers 134*a*, 134*b* may define a gap G therebetween (see FIG. 4) which is selected to capture door 114 therein. As shown in FIG. 4, gap G has been selected to engage an optional upper rail 117 of a framed door 114*a*. However, should a frameless glass door be installed, keepers 134*a*, 134*b* may be outfitted with removable shims 140*a*, 140*b* wherein shims 140*a*, 140*b* (FIG. 5), attachable to keeper contact faces 141, operate to create reduced gap distance G' (see FIG. 7A) and are configured to engage the glass panel of the frameless glass door (such as that shown in FIG. 1). In this manner, keepers 134*a*, 134*b* (and optional shims 140*a*, 140*b* if required) may secure door 114 (or glass door 114' fitted with upper rail 117) in a locked position as will be discussed in greater detail below.

Figure 2A:
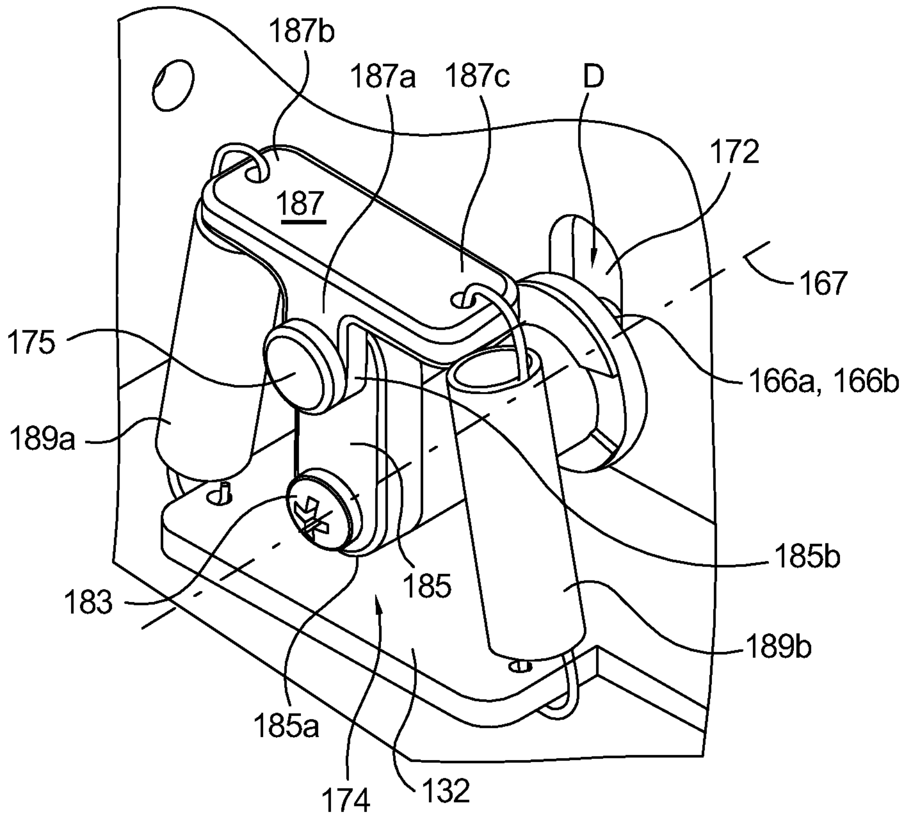
FIG. 2A is a close-up view of a keeper shaft biasing assembly shown in FIG. 2, in accordance with the invention.
Figure 2:
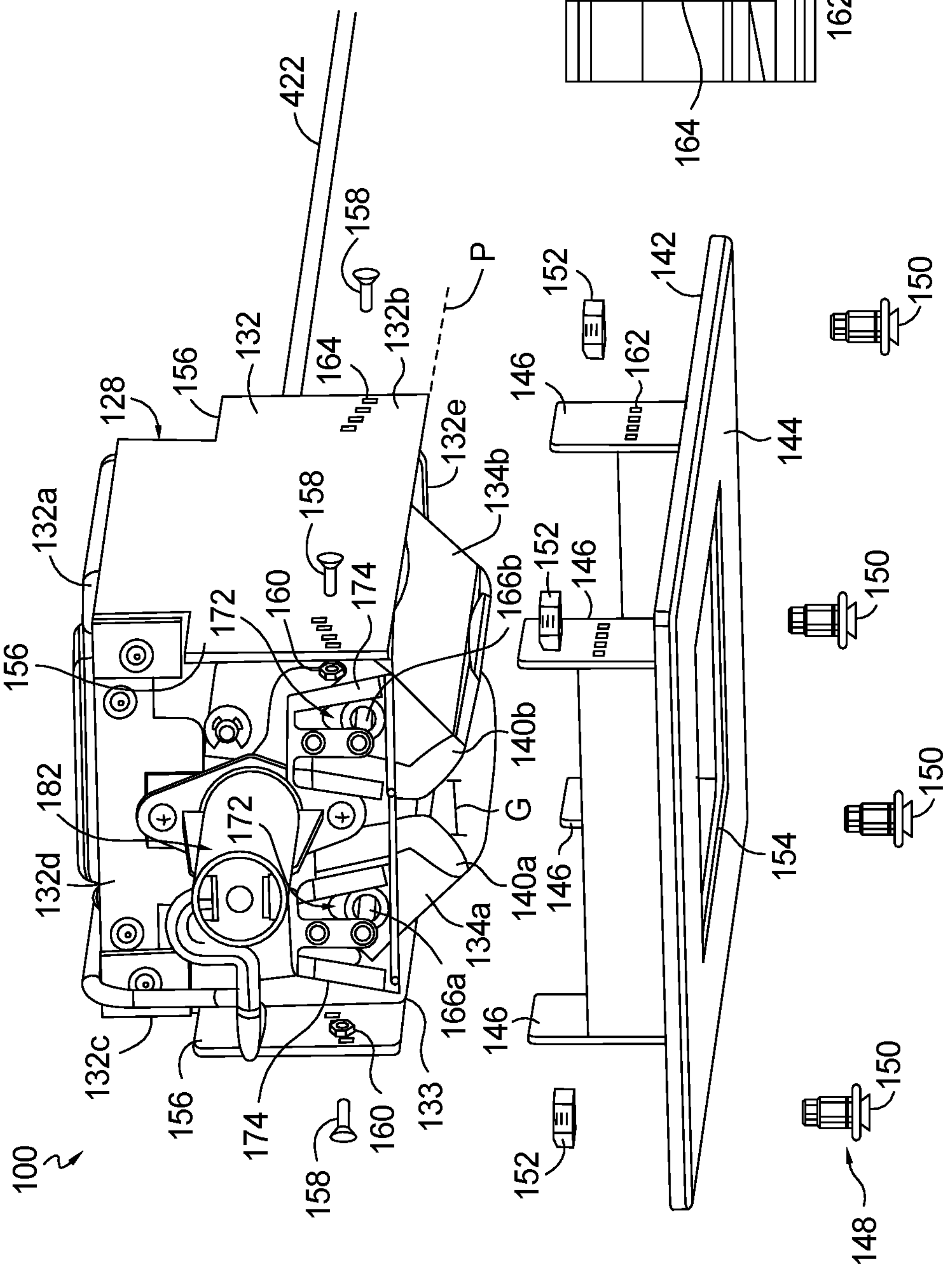
FIG. 2 is a partially exploded view of the electric locking device shown in FIG. 1.

In a further aspect, and in reference to FIG. 2, lock unit 128 may be secured to upper frame member 130 via mounting plate 142 which may include a generally horizontal mounting surface 144 with vertically extending tabs 146. Mounting plate 142 may be securely fixed to the upper frame member 130 using appropriate fasteners 148, such as screw 150/nut 152 pairs as is known in the art. Mounting plate 142 may further include an opening 154 through which is disposed at least a portion of keepers 134*a*, 134*b*.

Figure 3:
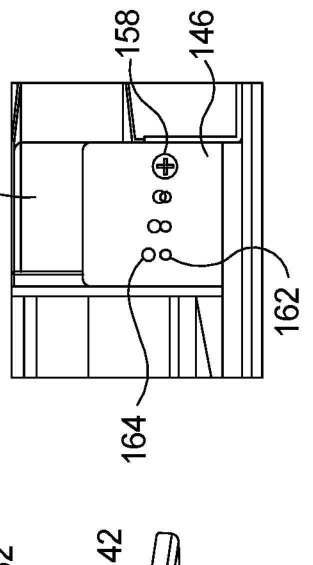
FIG. 3 is a partial exploded view of the mounting holes within the electric locking device shown in FIG. 2.

As shown most clearly in FIGS. 2 and 3, each respective vertically extending tab 146 may be configured to adjustably engage a flange 156 on front wall 132*b* and back wall 132*c* of lock housing 132. A fastener, such as screw 158/nut 160 pair may affix lock housing 132 to extending tabs 146. To that end, and to provide for vertical adjustability of the housing relative to mounting surface 144, each vertically extending tab 146 may include a plurality of holes 162 while each flange 156 may include a plurality of holes 164 wherein the patterns of the plurality of holes differ and a respective pair of holes may align with one another to allow passage of screw 158 therethrough (see FIG. 3).

As for example as shown in FIG. 3, one pattern of holes 164 may be disposed in one of the housing or mounting plate at an angle relative to the pattern of holes 162 disposed in the other of the housing or mounting plate. As a result, only one respective pair of holes 162/164 will properly align depending upon the relative vertical position of lock housing 132 within opening 154 while the remainder of the holes will remain unaligned. In this manner, lock housing may be vertically positioned and affixed so that keepers 134*a*, 134*b* are disposed within opening 154 to extend below a plane P defined by the bottom edges of walls 132*b*-132*e* so that keeper 134*a*, 134*b* engage door 114 when electric locking device 100 is in a locked state.

With reference to FIGS. 2, 2A, 5 and 6, keepers 134*a*, 134*b* are rotatably mounted within lock housing 132 via respective keeper shafts 166*a*, 166*b* having opposing first and second ends 168, 170 which pass through vertically elongated slots 172 defined within left side wall 132*d* and right side wall 132*e*. In this manner, each keeper 134*a*, 134*b* may rotate upon its respective keeper shaft 166*a*, 166*b*, about the shaft's axis of rotation 167, between a first rotational position and a second rotational position, while also translating generally linearly between a first directional position and a second directional position, to the extent each keeper shaft 166*a*, 166*b* may travel within its respective slot 172. Each first and second end 168, 170 may be further coupled to a biasing assembly 174 configured to bias the shaft and therefore keeper 134*a*, 134*b* in a direction D to its extended position, in a direction away from top wall 132*a* of the housing such as that shown in FIG. 2A.

Referring specifically to FIG. 2A, biasing assembly 174 includes link 185, yoke 187 and biasing members 189*a* and 189*b*. Biasing members 189*a* and 189*b* may be tension springs as shown. A first end 185*a* of link 185 may be fixedly attached to each opposing ends 168, 170 of shafts 166*a*, 166*b* by a suitable fastener such as screw 183 as shown. Yoke 187 may be attached at a center point 187*a* to a second end 185*b* of link 185 by pin 175 as shown. In one aspect of the invention, yoke 187 may be rotatably attached to link 185 by a pivot pin. A first end of each biasing member 189*a* and 189*b* may be attached to respective ends 187*b* and 187*c* of yoke 187. A second end of each biasing member 189*a* and 189*b* may be attached to lock housing 132. As can be seen, by way of biasing assembly 174, each keeper shaft 166*a*, 166*b* may be biased in direction D, within their respective slots 172 and may also be permitted to rotate within their respective slots. Further, the biasing forces, when balanced between biasing members 189*a* and 189*b*, serve to return the respective keepers to their default positions as shown in FIG. 7A.

As further shown in FIG. 4, inhibitors 176*a*, 176*b* may be pivotally mounted within lock housing 132 via respective inhibitor shafts 178*a*, 178*b* passing through left and right side walls 132*d*, 132*e*. Each inhibitor 176*a*, 176*b* may be coupled to its respective keeper 134*a*, 134*b* via a respective leg portion 177*a*, 177*b*. In this manner, each inhibitor may pivot between a coupled position wherein the keeper is maintained in a locked orientation and an uncoupled position wherein the keeper is free to rotate and thereby allow door 114 to open, as will be discussed in greater detail below.

Figure 17:
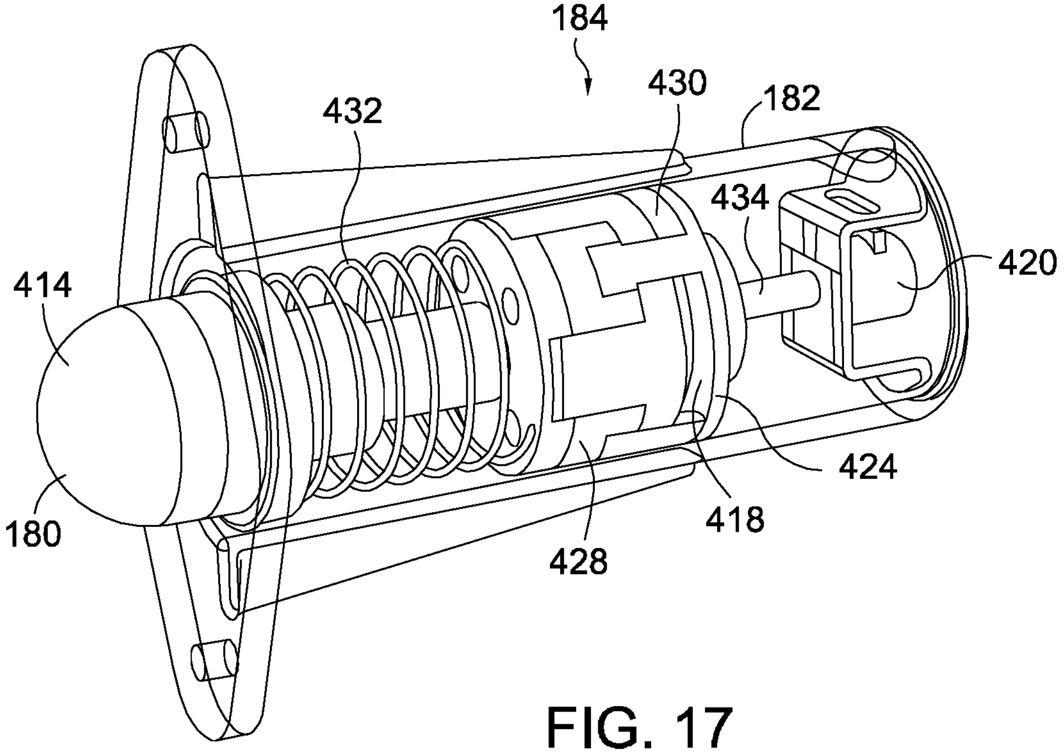
FIG. 17 is a phantom perspective view of a latch assembly suitable for use within the electric locking devices shown within FIGS. 1-16.

Each inhibitor 176*a*, 176*b* may also include an inhibitor spring 181*a*, 181*b* disposed about a respective inhibitor shaft 178*a*, 178*b* wherein each inhibitor spring biases the inhibitor to the coupled position (FIG. 4). Rotation of inhibitors 176*a*, 176*b* is dependent upon the orientation of latch bolt 180 with respect to latch housing 182 of latch assembly 184 (FIG. 17). As will be described in greater detail below, latch housing 182 is mounted to either left side wall 132*d* or right side wall 132*e* such that latch bolt 180, when in a locked orientation, extends into lock housing 132 to engage inhibitors 176*a*, 176*b* thereby preventing rotation of inhibitors 176*a*, 176*b* from the coupled position. Selective retraction of latch bolt 180 to an unlocked orientation disengages latch bolt 180 from inhibitors 176*a*, 176*b* thereby permitting rotation of the inhibitors and unlocking of door 114 as will be described.

Figure 7A:
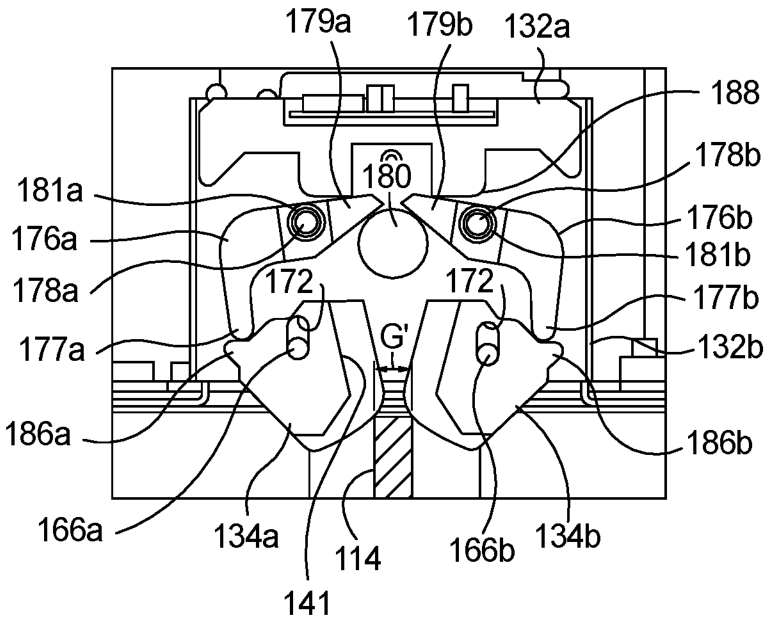
FIGS. 7A, 7B and 7C are cross-section end views of the electric locking device shown in FIG. 1 generally illustrating an unlocking sequence.
Figure 7B:
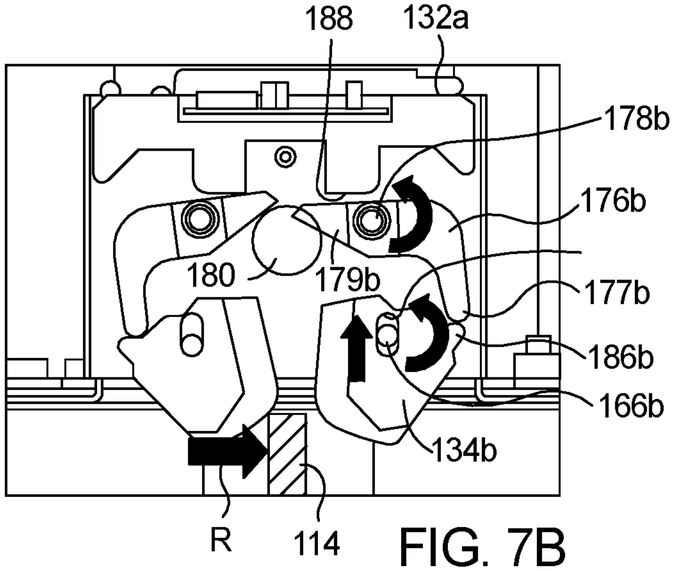
Figure 7C:
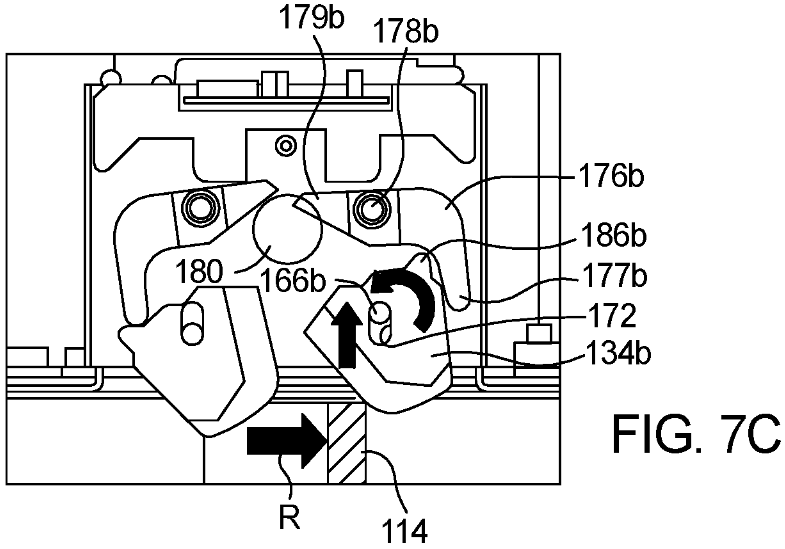

Operation of electric locking device 100 when permitting a locked door to be opened is shown generally in FIGS. 7A-7C. FIG. 7A shows electric locking device 100 in its default locked state, used in conjunction with an optional frameless door, wherein latch bolt 180 engages head portion 179*a*, 179*b* of inhibitors 176*a*, 176*b* to prevent rotation of the inhibitors about inhibitor shafts 178*a*, 178*b* in a first direction (i.e. inhibitor 176*a* is prevented from rotating clockwise and inhibitor 176*b* is prevented from rotating counterclockwise). In this state, the door is secured to the door frame by keeper 134*a*, 134*b*. Head portion 179*a*, 179*b* may also contact an inner surface 188 of top wall 132*a* to prevent rotation of the inhibitors in the opposite direction (i.e. inhibitor 176*a* is prevented from rotating counterclockwise and inhibitor 176*b* is prohibited from rotating clockwise). Inhibitor leg portions 177*a*, 177*b* engage a shoulder 186*a*, 186*b* on respective keepers 134*a*, 134*b* so as to prevent vertical translation and rotation of the keepers should an attempt be made to open door 114 either inwardly or outwardly.

Figure 6:
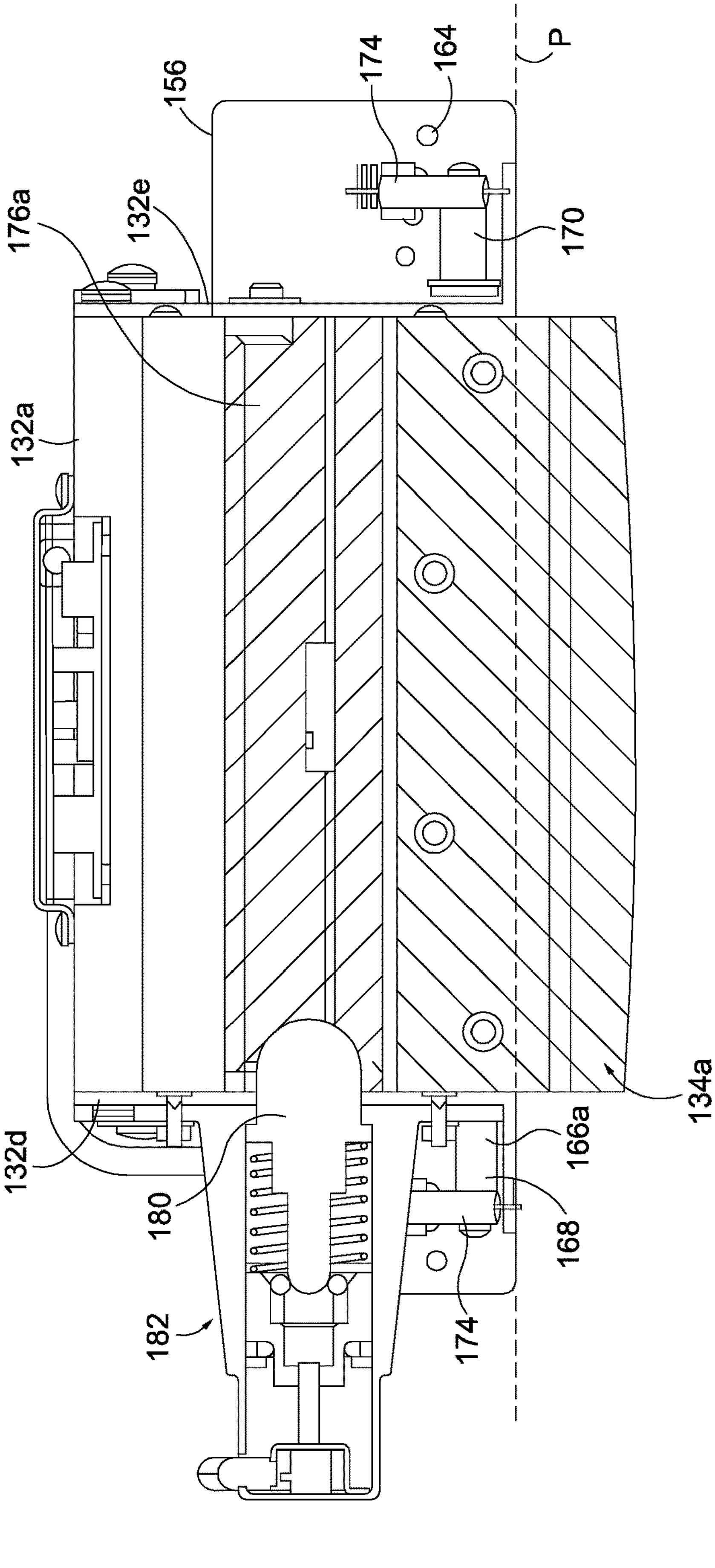
FIG. 6 is a cross-section side view a lock unit used within the electric locking device shown in FIG. 1.

Turning now to FIG. 7B, latch bolt 180 has been retracted into latch housing and electric locking device is in an unlocked state. Because each inhibitor 176*a*, 176*b* is biased to the coupled position shown in FIG. 7A by respective inhibitor springs 181*a*, 181*b* and each keeper 134*a*, 134*b* is biased to the extended orientation shown in FIG. 7A by biasing assemblies 174, the inhibitors and keepers will remain in the positions shown in FIG. 7A without any external force directed upon them, such as by movement of door 114. However, as shown in FIG. 7B, directing door 114 rightward in direction R causes door 114 to engage keeper 134*b*. As a result, keeper shaft 166*b* is directed upwardly within slot 172 as keeper 134*b* rotates counterclockwise upon keeper shaft 166*b*. Upward travel of keeper 134*b* causes counterclockwise rotation of inhibitor 176*b* whereby inhibitor leg portion 177*b* may disengage shoulder 186*b*. As shown in FIG. 7C, continued rightward movement in direction R of door 114 further drives keeper 134*b* and keeper shaft 166*b* upward with continued rotation of keeper 134*b* until inhibitor leg portion 177*b* clears shoulder 186*b* so that door 114 has cleared keeper 134*b* whereby door 114 is unimpeded and free to be opened and move away from the door frame. Once door 114 clears keeper 134*b*, inhibitor spring 181*b* and keeper biasing assembly 174 bias inhibitor 181*b* and keeper 134*b* to their respective default positions shown in FIG. 7A. Latch bolt 180 may then be selectively returned to the extended position as shown in FIG. 6.

Figure 8A:
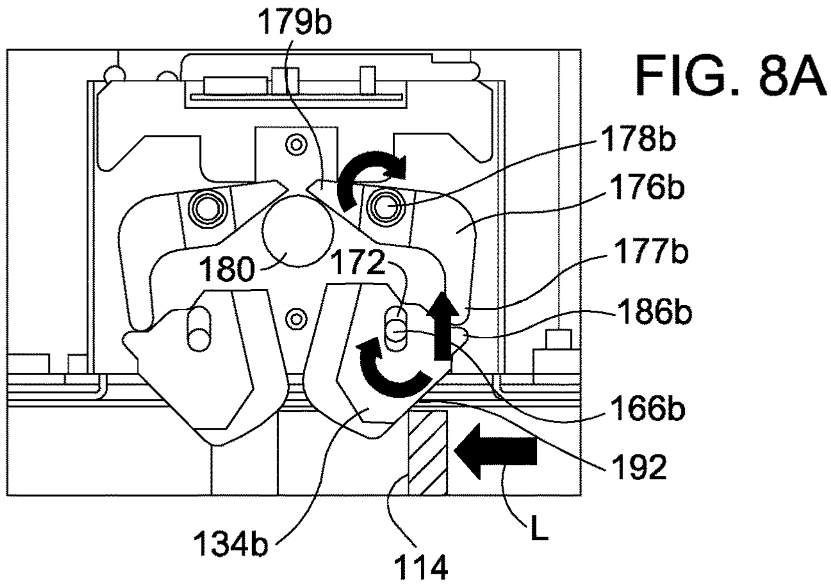
FIGS. 8A, 8B, 8C are cross-section end views of the electric locking device shown in FIG. 1 generally illustrating a locking sequence.
Figure 8B:
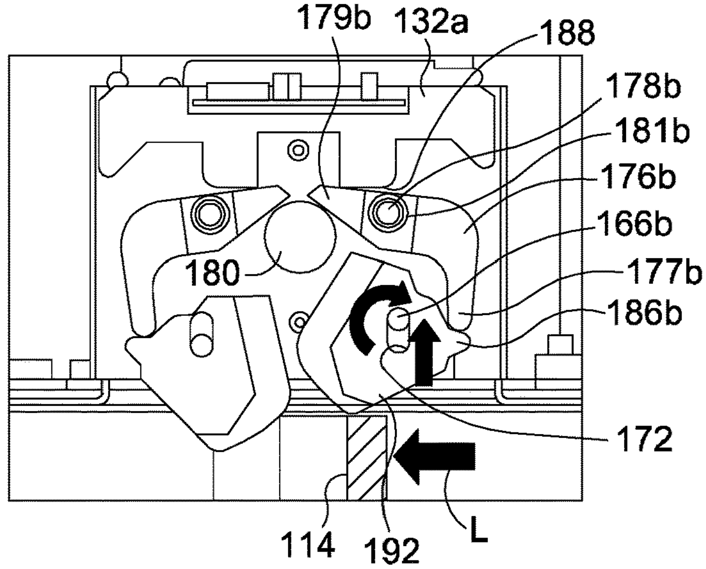
Figure 8C:
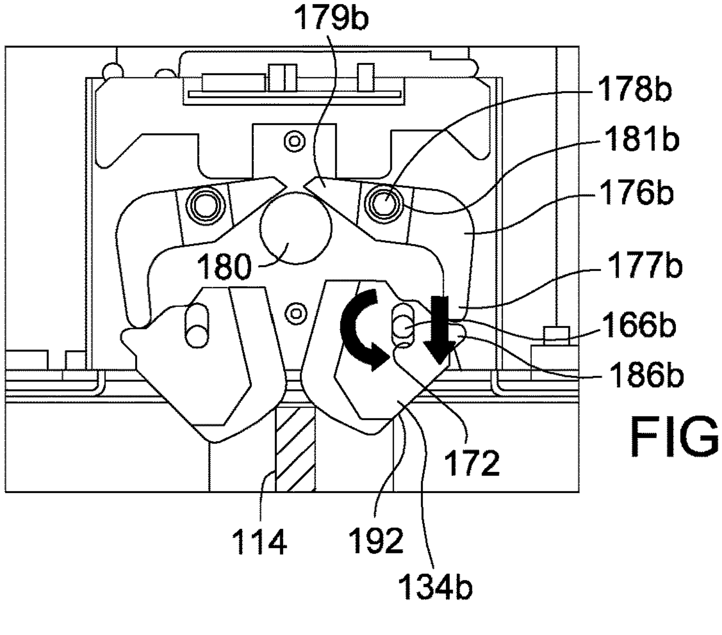

Return closure of door 114 is shown in FIGS. 8A-8C. Note that the latch bolt 180 is extended and engageable with inhibitor 176*a*, 176*b* during the entire sequence, 8A-8C. As shown in FIG. 8A, door 114 moves leftward in direction L and contacts external face 192 of keeper 134*b* causing keeper shaft 166*b* to travel upwardly in slot 172 while keeper 134*b* rotates clockwise about keeper shaft 166*b*. As shown in FIG. 8B, continued leftward travel of door 114 in direction L continues to drive keeper 134*b* and keeper shaft 166*b* upwardly while keeper 134*b* continues to rotate in a clockwise direction until door 114 clears keeper 134*b* and engages keeper 134*a*. As shown in FIG. 8C, keeper biasing assembly 174 then biases keeper 134*b* and keeper shaft 166*b* toward their default positions such that door 114 will become lockingly received within gap G as shown in FIG. 7A.

Figure 9:
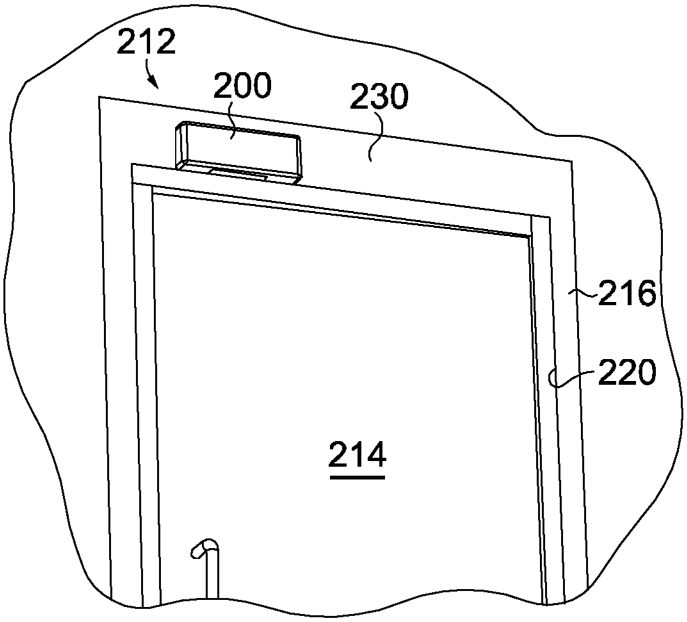
FIG. 9 is a plan view of a uni-directional door installation including an electric locking device in accordance with a further aspect of the present invention.
Figure 10:
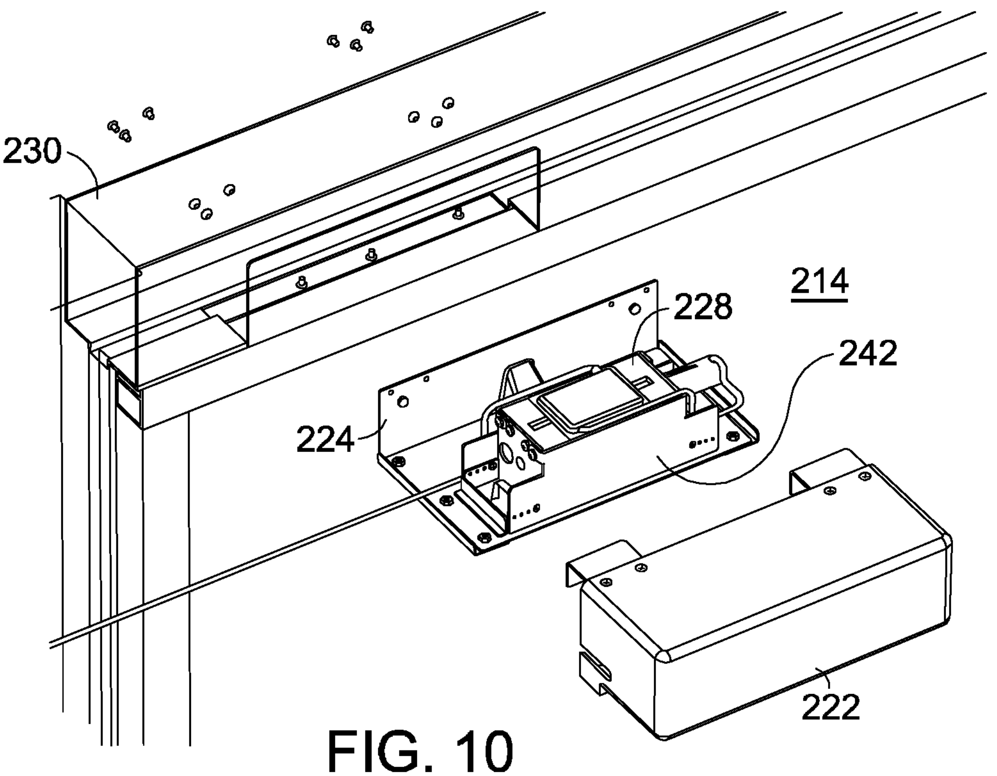
FIG. 10 is a partially exploded view of the electric locking device used within the uni-directional door installation shown in FIG. 9.
Figure 11:
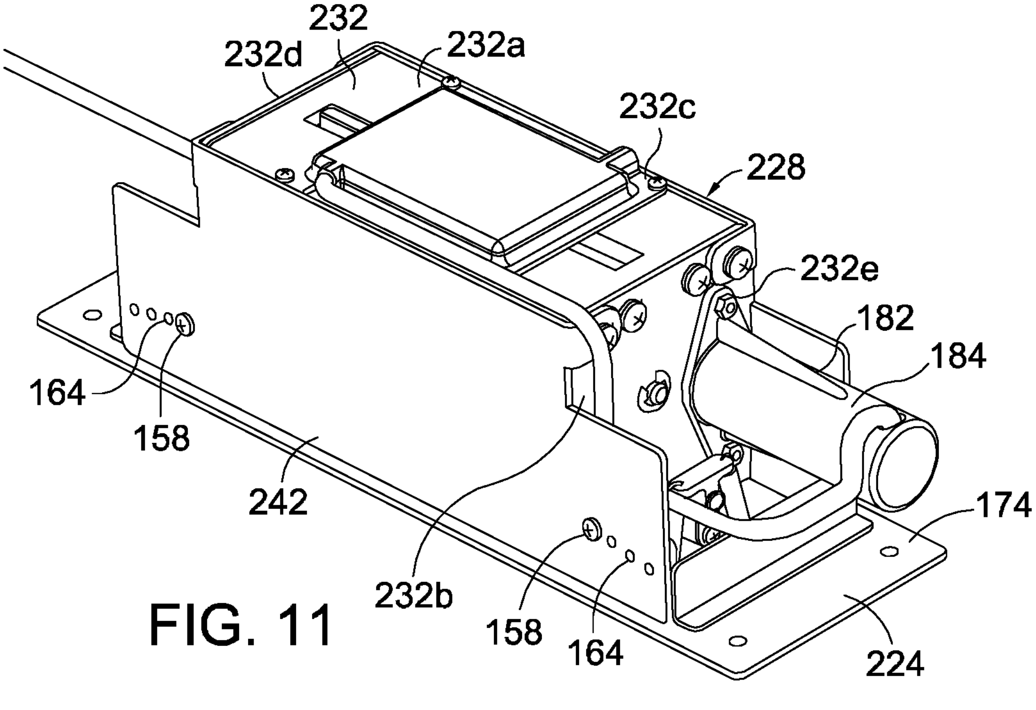
FIG. 11 is perspective view of a lock unit used within electric locking device shown in FIG. 10.

With reference to FIGS. 9 through 13, an overhead electric locking device 200 configured for use with a unidirectional door installation 212 is shown. Door installation 212 may include a door 214 pivotally mounted within a frame 216 at a hinge edge 220. Door 214 is prevented from swinging outwardly (FIG. 9, into the page) through abutting engagement with jamb 218 of frame 216 (see FIG. 12). Electric locking device 200 may include a lock unit 228 that may be configured to be secured within transverse upper frame member 230 above door 214, as shown in FIG. 10, and configured to selectively unlock door 214 for permitting inswing of door 214.

Figure 12:
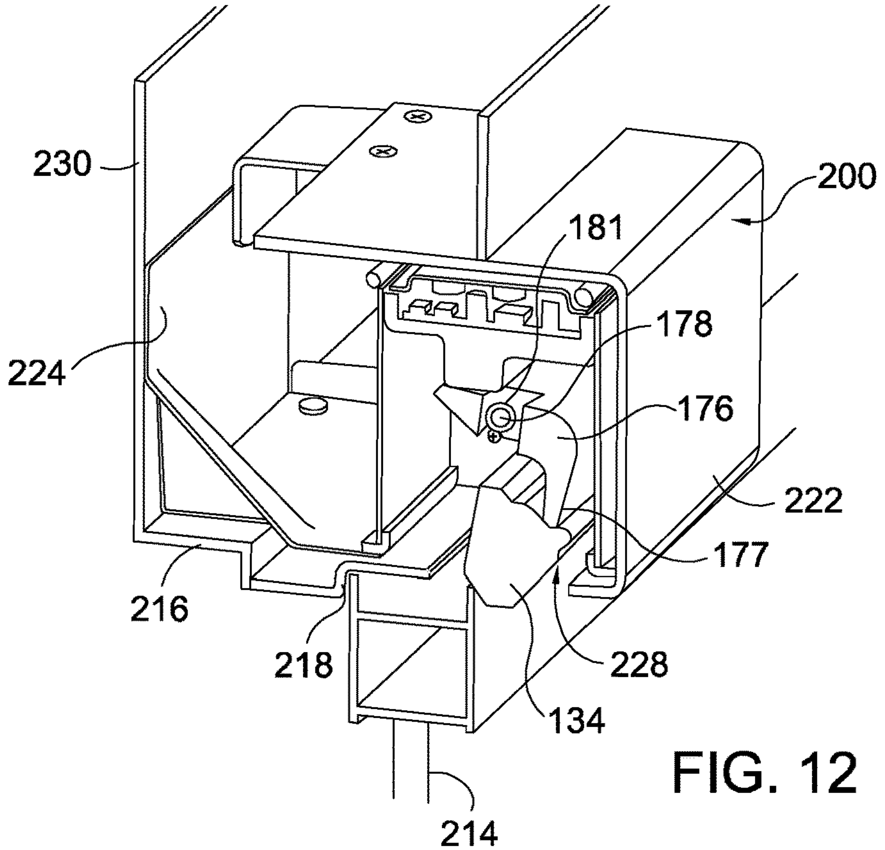
FIG. 12 is a partial cross-section view of the uni-directional door installation shown in FIG. 9.

Lock unit 228 is similar to lock unit 128 described above, also including a lock housing 232 having a top wall 232*a* and a front wall 232*b*, back wall 232*c*, left side wall 232*d* and right side wall 232*e* proportioned to receive a single keeper 134 and inhibitor 176. Lock unit 228 may be secured to upper frame member 230 via L-shaped mounting plate 224 having wall surface 242. The position of lock housing 232 with respect to mounting plate 224 may be vertically adjusted through a similar set of holes formed in front wall 232*b* of housing 232 (not shown) and mating holes 164 in wall surface 242 of mounting plate 224 as described in reference to device 100. To adjust the relative positions of keeper 134 to door 214, first, lock housing 232 is secured to wall surface 242 of mounting plate 224 using fasteners 158, after aligning one pair of holes 164 with a selected pair of holes in housing 232 to obtain the desired keeper to door relationship. Then, the housing/mounting plate is secured to the door frame as shown in FIGS. 10 and 12. Cover 222 may then be secured over that portion of mounting bracket 224/lock unit 228 which extends outwardly from upper frame member 230 following installation (see FIG. 10).

Figure 13:
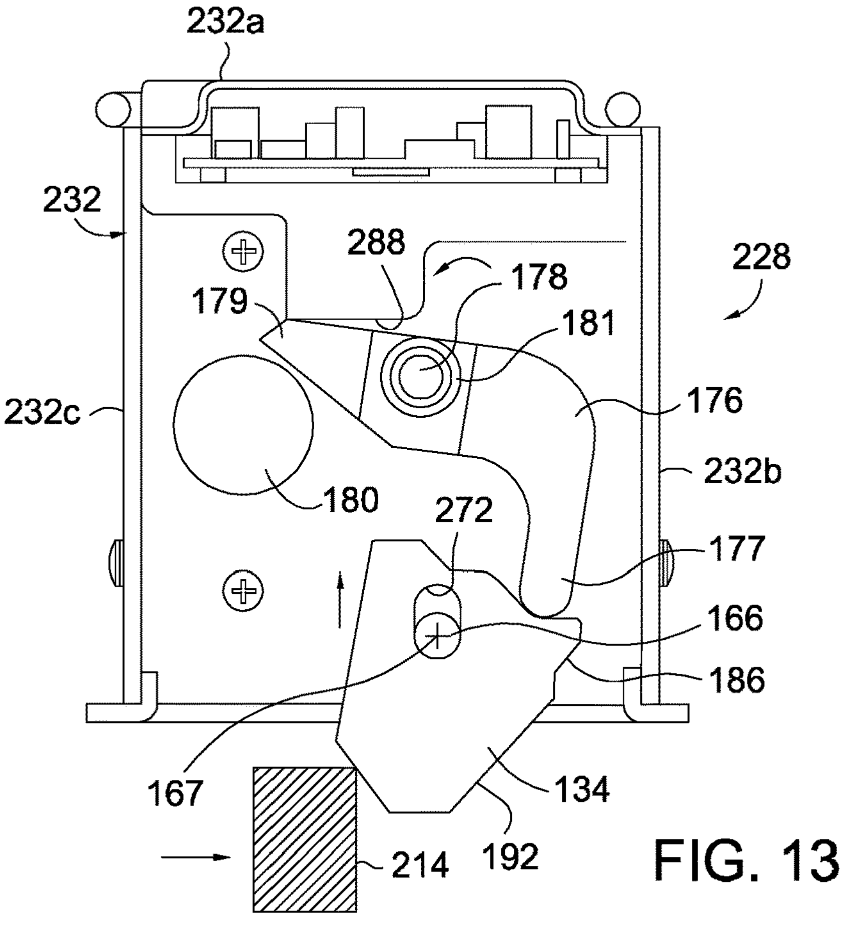
FIG. 13 cross-section end view of the electric locking device shown in FIG. 11.

With continued reference to FIGS. 12 and 13, a single keeper 134 rotationally mounted within lock housing 232 via keeper shaft 166 having opposing first and second ends which pass through vertically elongated slots 272 defined within left side wall 232*d* and right side wall 232*e* of lock housing 232. In this manner, keeper 134 may rotate upon keeper shaft 166, about the shaft's axis of rotation 167, between a first rotational position and a second rotational position, while also translating generally linearly between a first directional position and a second directional position, to the extent keeper shaft 166 may travel within slot 272. The first and second ends may be further coupled to a biasing assembly 174 as described above, and configured to bias the shaft and therefore keeper 134 to its extended position, in a direction away from the top wall of the housing such as that shown in FIGS. 12 and 13.

As further shown in FIGS. 12 and 13, a single inhibitor 176 may be pivotally mounted within lock housing 232 via inhibitor shaft 178 passing through left and right side walls 232*d*, 232*e*. Inhibitor 176 may be coupled to keeper 134 via leg portion 177. In this manner, inhibitor 176 may pivot between a coupled position shown in FIG. 13 wherein keeper 134 is maintained in a locked orientation and an uncoupled position wherein keeper 134 is free to rotate and thereby allow door 214 to open. Inhibitor 176 may also include an inhibitor spring 181 disposed about inhibitor shaft 178 wherein inhibitor spring 181 biases inhibitor 176 toward the coupled position shown.

Rotation of inhibitor 176 is dependent upon the orientation of latch bolt 180 with respect to latch housing 182 of latch assembly 184. Latch housing 182 may be mounted to either left side wall 232*d* or right side wall 232*e* such that latch bolt 180, when in a locked orientation, extends into lock housing 232 to engage inhibitor 176 thereby preventing rotation of inhibitor 176 from the coupled position. Selective retraction of latch bolt 180 to an unlocked orientation disengages latch bolt 180 from inhibitor 176 thereby permitting rotation of inhibitor 176 and unlocking of door 214 as will be described.

Operation of electric locking device 200 when permitting locked uni-directional door 214 to be opened is similar to that operation of electric locking device 100 shown and described above and generally in view of FIGS. 7A-7C. However, as door 214 is a uni-directional door, door jamb 218 prevents outswing of the door so that only one keeper/inhibitor assembly is required to selectively lock uni-directional door 214. Similar to that operation described above, and with reference to FIG. 13, when electric locking device 200 is in its default locked state latch bolt 180 engages head portion 179 of inhibitor 176 to prevent rotation of the inhibitor 176 about inhibitor shaft 178 in a first direction (i.e. inhibitor 176 is prevented from rotating counterclockwise). Head portion 179 may also contact an inner surface 288 of top wall 232*a* to prevent rotation of inhibitor 176 in the opposite direction (i.e. inhibitor 176 is prevented from rotating clockwise). Inhibitor leg portion 177 engages a shoulder 186 on keeper 134 so as to prevent vertical translation and rotation of keeper 134 should an attempt be made to open door 214 inwardly (FIG. 9, out of the page).

To selectively unlock and permit opening of inswing door 214, latch bolt 180 is selectively retracted into latch housing 182 to place electric locking device 200 in an unlocked state. Because inhibitor 176 is biased to the coupled position by inhibitor spring 181 and keeper 134 is biased to the extended orientation by biasing assembly 174 as described in reference to locking device 100, inhibitor 176 and keeper 134 will remain in the default positions shown in FIG. 13 without any external force directed upon them, such as by inward movement of door 214. However, inswinging of door 214 (FIG. 9, out of the page) causes door 214 to engage keeper 134. As a result, keeper 134 and keeper shaft 166 are directed upwardly within slot 272 as keeper 134 rotates counterclockwise upon keeper shaft 166. Upward travel of keeper 134 causes counterclockwise rotation of inhibitor 176 whereby inhibitor leg portion 177 disengages shoulder 186. Continued inswing force of door 214 further drives keeper 134 and keeper shaft 166 upward with continued rotation of keeper 134 until door 214 has cleared keeper 134 whereby door 214 is unimpeded and free to be opened inwardly (FIG. 9, out of page). Once door 214 clears keeper 134, inhibitor spring 181 and keeper biasing assembly 174 bias inhibitor 181 and keeper 134 to their respective default positions shown in FIG. 13. Latch bolt 180 may then be selectively returned to the extended position, such as that shown in FIG. 6.

Return closure of door 214 is similar to that shown and described above in relation to FIGS. 8A-8C. Door 214 moves toward door jamb 218 (FIG. 9, into the page) and contacts external face 192 of keeper 134 causing keeper 134 and keeper shaft 166 to travel upwardly in slot 272 while keeper 134 rotates clockwise about keeper shaft 166. Upward travel of keeper 134 causes shoulder 186 to engage inhibitor leg portion 177 to rotate inhibitor 176 clockwise until inhibitor head portion 179 contacts latch bolt 180 whereby further clockwise rotation of inhibitor 176 is prevented. Continued travel of door 214 toward door jamb 218 continues to drive keeper 134 and keeper shaft 166 upwardly while keeper 134 continues to rotate in a clockwise direction until door 214 clears keeper 134 and engages door jamb 218. Keeper biasing assembly 174 then biases keeper 134 and keeper shaft 166 to their default positions such that door 214 is now lockingly received within electric locking device 200.

Figure 14:
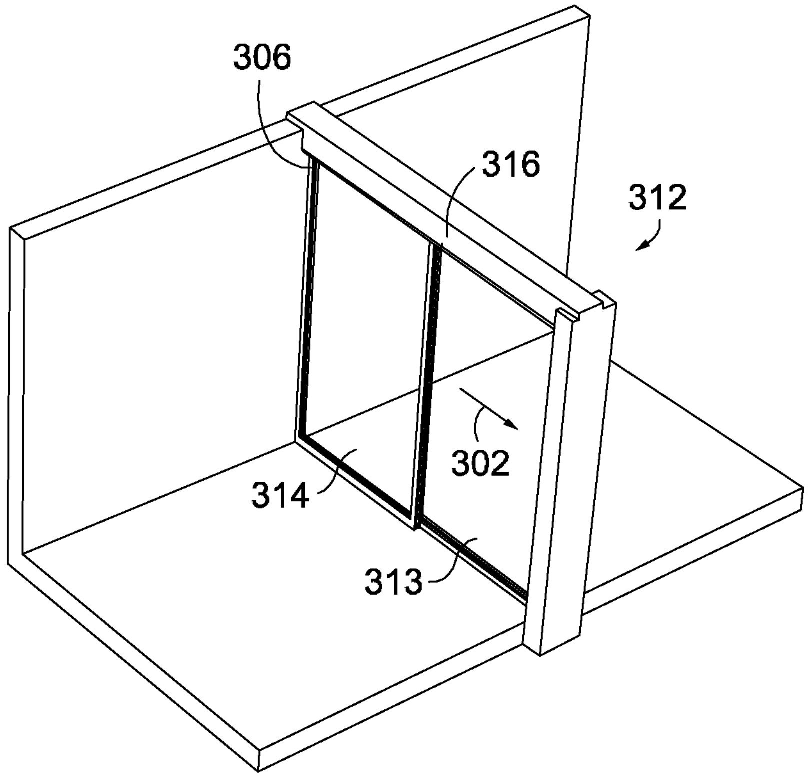
FIG. 14 is a plan view of a sliding door installation including an electric locking device in accordance with a further aspect of the present invention.
Figure 15:
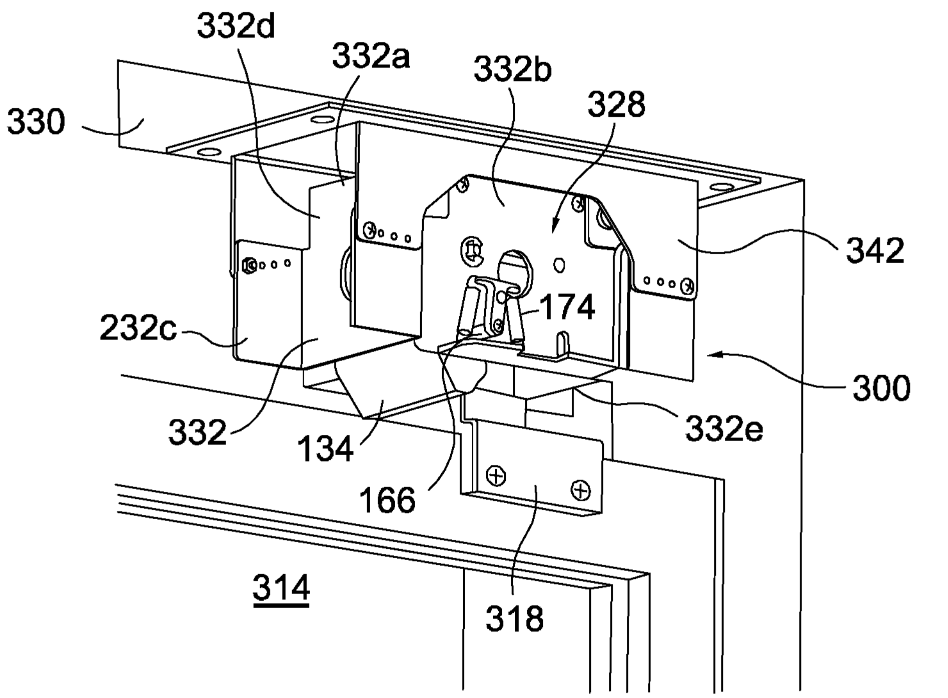
FIG. 15 a perspective view of the electric locking device shown in FIG. 14.
Figure 16:
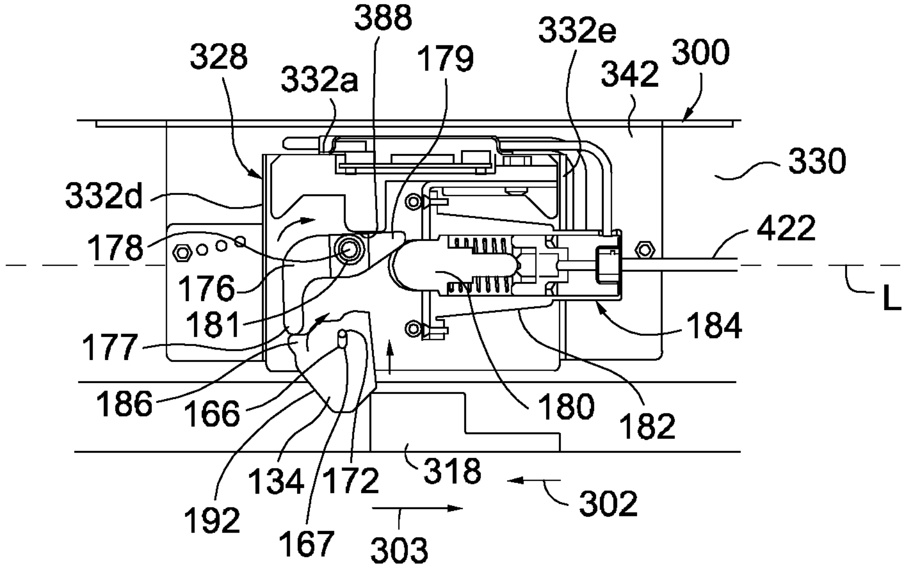
FIG. 16 is a cross-section side view of the electric locking device shown in FIG. 15.

Turning now to FIGS. 14-16, an overhead electric locking device 300 configured for use with a sliding door installation 312 is shown. Sliding door installation 312 may include a fixed panel 313 and sliding door 314 slidably mounted within a track 316 as is known in the art. Electric locking device 300 may include a lock unit 328 that may be configured to be mounted to transverse upper frame member 330 above door 314 proximate door latch edge 326 at any desired location along the top of sliding door 314. Lock unit 328 is similar to lock units 128 and 228 described above, also including a lock housing 332 having a top wall 332*a* and a front wall 332*b*, back wall 332*c*, left side wall 332*d* and right side wall 332*e* proportioned to receive a single keeper 134 and single inhibitor 176. Lock unit 328 may also be similarly secured to upper frame member 330 via mounting plate 342 which is similarly proportioned to lock housing 332. The position of lock housing 332 with respect to mounting plate 342 may be vertically adjusted through a similar arrangement described above with regard to mating sets of holes 162/164 of electric locking devices 100 and 200.

With continued reference to FIG. 16, keeper 134 is rotatably mounted within lock housing 332 via keeper shaft 166 having opposing first and second ends which pass through vertically elongated slots 172 defined within front wall 332*b* and back wall 332*c* of lock housing 332. In this manner, keeper 134 may rotate upon keeper shaft 166, about the shaft's axis of rotation 167, between a first rotational position and a second rotational position, while also translating generally linearly between a first directional position and a second directional position, to the extent keeper shaft 166 may travel within slot 172. Each of the first and second ends of keeper shaft 166 may be further coupled to a biasing assembly 174 as described with respect to FIG. 2A, and configured to bias the shaft and therefore keeper 134 to its extended position, in a direction away from the top wall of the housing such as that shown in FIGS. 15 and 16.

As further shown in FIG. 16, inhibitor 176 may be pivotally mounted within lock housing 332 via inhibitor shaft 178 passing through front wall 332*b* and back wall 332*c*. Inhibitor 176 may be coupled to keeper 134 via leg portion 177. In this manner, inhibitor 176 may pivot between a coupled position wherein keeper 134 is maintained in a locked orientation and an uncoupled position wherein keeper 134 is free to rotate and thereby allow door 314 to slide open in the direction shown by arrow 302.

Inhibitor 176 may also include an inhibitor spring 181 disposed about inhibitor shaft 178 to bias inhibitor 176 to the coupled position (FIG. 16). Rotation of inhibitor 176 is dependent upon the orientation of latch bolt 180 with respect to latch housing 182 of latch assembly 184. Latch housing 182 may be mounted to right side wall 332*e* such that latch bolt 180, when in a locked orientation, engages inhibitor 176 thereby preventing rotation of inhibitor 176 from the coupled position. Selective retraction of latch bolt 180 to an unlocked orientation disengages latch bolt 180 from inhibitor 176 thereby permitting rotation of the inhibitor and unlocking of door 314 as will be described.

Operation of electric locking device 300 when permitting locked sliding door 314 to be opened is similar to that operation of electric locking devices 100 and 200 shown and described with the exception that keeper 134 and inhibitor 176 are oriented normal to the longitudinal axis L of lock housing 332 and latch bolt 180. As shown in FIGS. 15 and 16, electric locking device 300 in its default locked state wherein latch bolt 180 engages head portion 179 of inhibitor 176 to prevent rotation of inhibitor 176 about inhibitor shaft 178 in a first direction (i.e. inhibitor 176 is prevented from rotating clockwise). Head portion 179 may also contact an inner surface 388 of top wall 332*a* to prevent rotation of inhibitor 176 in the opposite direction (i.e. inhibitor 176 is prevented from rotating counterclockwise). Inhibitor leg portion 177 engages shoulder 186 on keeper 134 so as to prevent vertical translation and rotation of the keeper should an attempt be made to slide door 314 in opening direction 302.

Retraction of latch bolt 180, such as in direction 303, retracts latch bolt 180 into latch housing 182 thereby placing electric locking device 300 in an unlocked state. Because inhibitor 176 is biased to the coupled position by inhibitor spring 181 and keeper 134 is biased to the extended orientation by biasing assembly 174, inhibitor 176 and keeper 134 will remain in their default positions shown in FIGS. 15 and 16 absent any external force directed upon them, such as by sliding movement of door 314 in direction 302. However, with latch bolt 180 retracted, sliding door 314 in direction 302 causes a door stop 318 mounted on door 314 to engage keeper 134. As a result, keeper 134 and keeper shaft 166 are directed upwardly within the slot in lock housing 332 as keeper 134 rotates clockwise upon keeper shaft 166. Upward travel of keeper 134 causes clockwise rotation of inhibitor 176 whereby inhibitor leg portion 177 disengages shoulder 186 as described above. Continued door opening force in direction 302 further drives door stop 318 into keeper 134. As a result, keeper 134 and keeper shaft 166 continue to travel upward with continued clockwise rotation of keeper 134 until door stop 318 has cleared keeper 134 whereby door 314 is unimpeded and free to slide open. Once door stop 318 clears keeper 134, inhibitor spring 181 and keeper biasing assembly 174 bias inhibitor 181 and keeper 134 to their respective default positions shown in FIGS. 15 and 16. Latch bolt 180 may then be selectively returned to its extended position, such as that shown in FIG. 6.

Return closure of door 314 is similar to that shown and described above in relation to FIGS. 8A-8C. As door 314 moves in a closing direction opposite opening direction 302 (such as direction 303), door stop 318 contacts external face 192 of keeper 134 causing keeper 134 and keeper shaft 166 to travel upwardly in the slot within housing 332 while keeper 134 rotates counterclockwise on keeper shaft 166. Upward travel of keeper 134 causes shoulder 186 to engage inhibitor leg portion 177 to rotate inhibitor 176 clockwise until inhibitor head portion 179 contacts latch bolt 180 whereby further clockwise rotation of inhibitor 176 is prevented. Continued travel of door 314 in the closing direction continues to drive door stop 318 against keeper 134 causing keeper 134 and keeper shaft 166 to continue moving upwardly while keeper 134 continues to rotate in a counterclockwise direction until door stop 314 clears keeper 134. Keeper biasing assembly 174 then biases keeper 134 and keeper shaft 166 to their default positions such that door 314 is now locked as shown in FIGS. 15 and 16.

Figure 20:
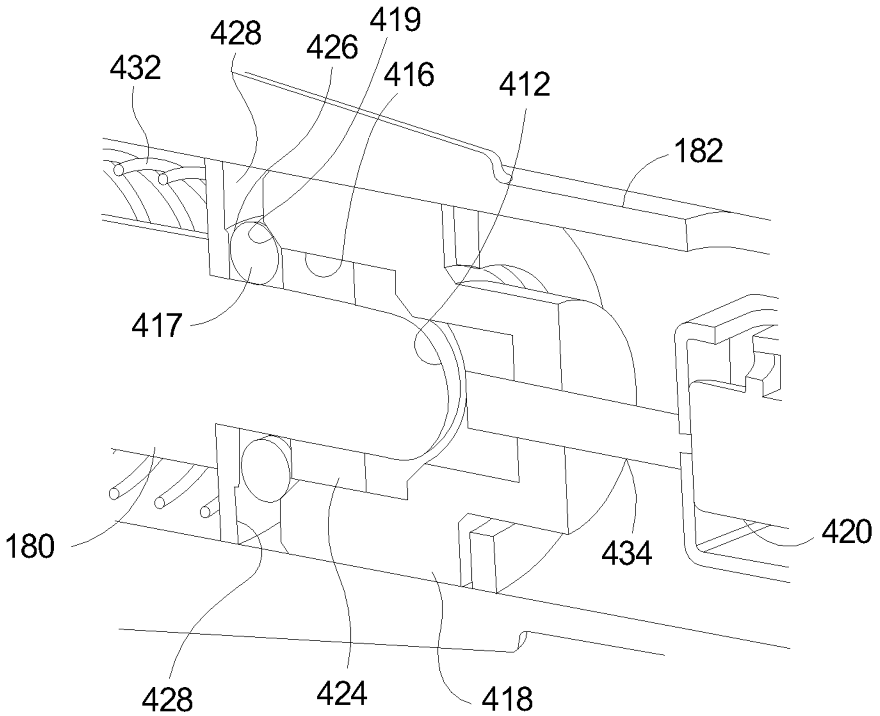
FIG. 20 is an exploded cross-section view of the locking mechanism of the latch assembly shown in FIG. 18 with the latch in an unlocked orientation.

In each of the above examples of an electric locking device (electric locking devices 100, 200, 300), each electric locking device utilized a universal latch assembly 184 shown in FIGS. 17-20. To that end, latch assembly 184 may generally comprise a latch housing 182 and a latch bolt 180 disposed within the latch housing 182. Latch bolt 180 has a first end 412 and an opposing second end 414. Second end 414 is configured to extend outwardly from latch housing 182 to engage inhibitor 176 when in a locked orientation (FIGS. 17-19), and to be slidably received within latch housing 182 when in an unlocked orientation (FIG. 20). Blocking member 416 is moveable between an engaged position (FIGS. 18 and 19), wherein latch bolt 180 is maintained in the locked orientation and an unengaged position (FIG. 20), wherein latch bolt 180 may move to the unlocked orientation. Blocking element 418 may be coupled to blocking member 416 and be moveable along a linear path between a blocking position wherein blocking member 416 is in the engaged position (FIGS. 18 and 19), and an unblocking position wherein blocking member 416 may move to the unengaged position (FIG. 20). An actuator 420 may be coupled to blocking element 418 and is configured to receive power from a power source (not shown) such as through wires 422 (see FIGS. 2, 11 and 16) so as to selectively move blocking element 418 between the blocking position (FIGS. 18 and 19) and the unblocking position (FIG. 20).

In a further aspect of the present invention, blocking member 416 is a ball and latch assembly 184 and may further include a ball race 424 fixedly secured to the latch housing 182. Ball race 424 may include one or more notches 426 configured to receive ball 416. In an aspect of the present invention, ball race 424 may include a plurality of notches 426 spaced apart an equal distance about the circumference of ball race 424.

Figure 18:
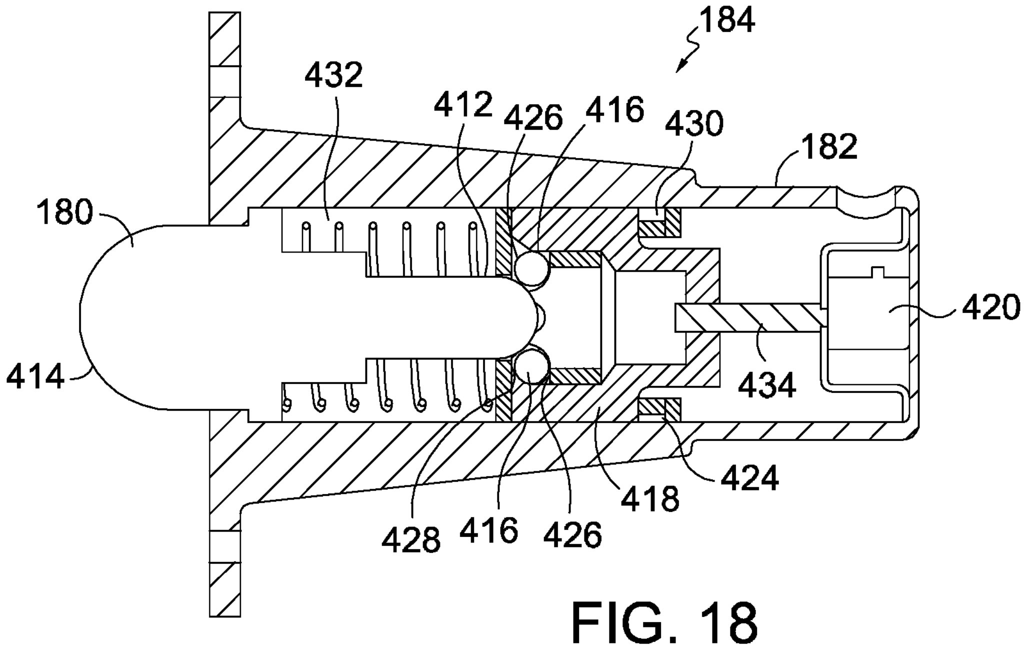
FIG. 18 is a cross-section side view of the latch assembly shown in FIG. 17.
Figure 19:
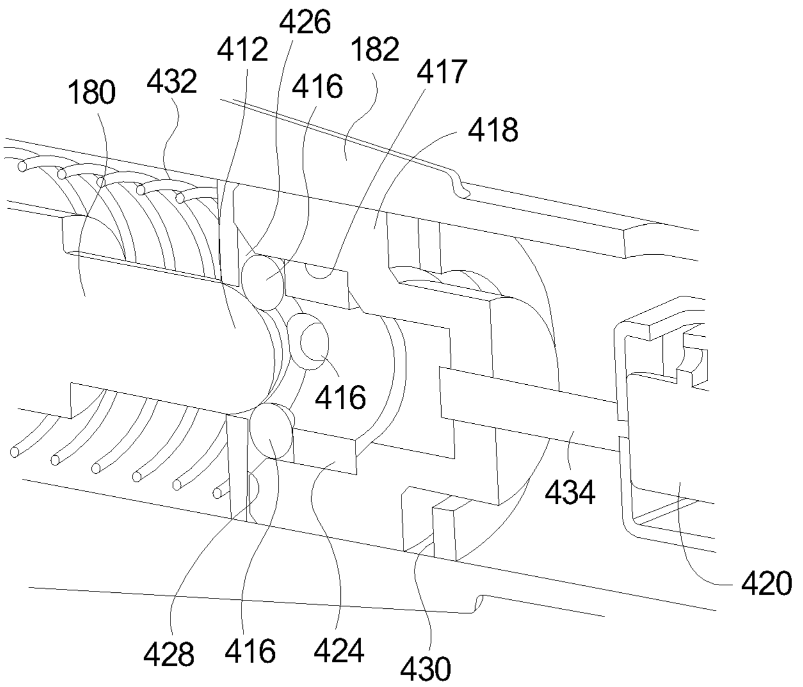
FIG. 19 is an exploded cross-section view of the locking mechanism of the latch assembly shown in FIG. 18 with the latch in a locked orientation.

By way of example, ball race 424 may include four (4) notches, each configured to receive a respective ball 416, spaced apart 90° from one another. When blocking element 418 is in the blocking position (FIG. 19), an inner diameter 417 of blocking element 418 overrides each ball 416 to position each ball 416 within a respective notch 426 so that ball 416 engages first end 412 of latch bolt 180 to secure latch bolt 180 in the locked orientation by preventing first end 412 from retracting within race 424. When blocking element 418 is in the unblocking position (FIG. 20), inner diameter 417 of blocking element 418 no longer overrides balls 416 so that balls 416 are engaged with an end portion 419 of blocking element 418. Latch bolt 180 may then position each ball 416 within its respective notch 426 so as to permit latch bolt 180 to move to the unlocked orientation. Blocking element 418 may be configured to capture ball 416 within ball race 424 when in the unblocking position so as to prevent ball 416 from escaping notch 426. Ball race 424 may further include a forward stop 428 and a rearward stop 430 configured to limit reciprocal travel of blocking element 418. A biasing member 432 may be coaxially aligned with latch bolt 180 and be configured to bias latch bolt 180 toward the locked orientation as shown in FIGS. 17 and 18.

In a further aspect of the invention, actuator 420 may be, for example, a solenoid. Actuator 420 may also be a stepper motor coupled to blocking element 418 via a drive screw 434, as shown. Powering of stepper motor 420 with a voltage having a first polarity may turn drive screw 434 in a first direction thereby retracting blocking element 418 and allowing latch bolt 180 to move to the unlocked orientation while powering stepper motor 420 with a voltage having the opposite polarity may turn drive screw 434 in an opposing second direction thereby extending blocking element 418 to the blocking position and maintaining latch bolt 180 in the locked orientation.

While the above aspects of the present invention describe electric locking devices for use with glass doors, it should be understood by those skilled in the art that such electric locking devices may be used with any suitable door system, including wood and metal doors.

Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

I claim:

1. A latch assembly for use within an electric locking device, the assembly comprising:

a) a latch housing;

b) a latch bolt disposed within said latch housing and having a first end and an opposing second end, said second end configured to be positioned in a first orientation outwardly from said latch housing and to be positioned in a second orientation inwardly of said first orientation;

c) a blocking member having an engaged position when said latch bolt is in said first orientation and an unengaged position when said latch bolt is in said second orientation; and d) a blocking element coupled to said blocking member and moveable along a linear path between a blocking position and an unblocking position, wherein when said blocking element is in said blocking position said blocking member is in said engaged position and said latch bolt is prevented from moving between said first orientation and said second orientation, and wherein when said blocking element is in said unblocking position said blocking member is in said unengaged position and said latch bolt is allowed to move relative to said blocking element between said first orientation and said second orientation.

2. The latch assembly in accordance with claim 1 wherein said blocking member is a ball.

3. The latch assembly in accordance with claim 2 wherein said blocking member further includes a ball race having a notch configured to receive said ball, wherein when in said blocking position said blocking element positions said ball to engage said first end of said latch bolt and secure said latch bolt in the first orientation, and wherein when said blocking element is in said unblocking position said ball is disposed within said notch to permit said latch bolt to move to said second orientation.

4. The latch assembly in accordance with claim 3 wherein said ball race includes a forward stop and a rearward stop configured to limit travel of said blocking element.

5. The latch assembly in accordance with claim 1 and further comprising a biasing member that is configured to bias said latch bolt toward said first orientation.

6. The latch assembly in accordance with claim 1 further including an actuator coupled to said blocking element and configured to selectively move said blocking element between said blocking position and said unblocking position.

7. The latch assembly in accordance with claim 6 wherein said actuator is a stepper motor.

8. The latch assembly in accordance with claim 1 wherein said blocking member is engaged with a distal end of said latch bolt when in said engaged position.

9. The latch assembly in accordance with claim 1 wherein said blocking element includes an end portion, and wherein said blocking member is engaged with the end portion when said blocking element is in said unblocking position.

10. An electric locking device for selectively locking and unlocking a door to a door frame, the door being pivotally coupled to the door frame, the electric locking device comprising:

a) a lock housing configured to be mounted to said door frame, wherein said lock housing includes a top wall and an open bottom opposite said top wall; and b) a keeper movably connected to said housing, wherein said keeper includes a keeper shaft having a shaft axis of rotation, i) wherein said keeper is rotatable about said shaft axis of rotation between a first rotational position and a second rotational position, ii) wherein said keeper is also movable between a first directional position and a second directional position relative to said lock housing, wherein said movement of said keeper between said first directional position and said second directional position is linear, and wherein said shaft axis of rotation is configured to move relative to said lock housing as said keeper moves between said first directional position and said second directional position, iii) wherein when said keeper is in said first rotational position and said first directional position, said door is secured to said door frame by said keeper, and iv) wherein when said keeper is in said second rotational position and said second directional position, said door is allowed to move away from said door frame.

11. The electric locking device in accordance with claim 10 wherein said movement from said first directional position toward said second directional position is toward said top wall of said housing.

12. The electric locking device in accordance with claim 11 further comprising a mounting plate configured to be secured to the door frame, said lock housing configured to be mounted to said mounting plate.

13. The electric locking device in accordance with claim 10 wherein said keeper is contactable by said door.

14. The electric locking device in accordance with claim 13 wherein a keeper shim is attachable to a keeper face of said keeper, and wherein said keeper shim is contactable by said door.

15. The electric locking device in accordance with claim 10 further comprising an inhibitor mounted within said lock housing and couple-able to the keeper, wherein said inhibitor is configured to move between a coupled position and an uncoupled position, and wherein, when said inhibitor is in said uncoupled position, said door is allowed to move away from said door frame, and wherein when said inhibitor is in said coupled position, said inhibitor is engaged with said keeper and said door is not allowed to move away from said door frame.

16. The electric locking device in accordance with claim 15 further comprising a latch bolt movable between a first orientation and a second orientation, said latch bolt configured to engage with said inhibitor when in said first orientation, wherein when said latch bolt is in said first orientation, said door is secured to said door frame by said keeper.

17. The electric locking device in accordance with claim 16 wherein said latch bolt is received within a latch assembly, said latch assembly comprising:

a) a latch housing, said latch bolt movably disposed within said latch housing between a first orientation outwardly from said latch housing and a second orientation inwardly from said first orientation;

b) a blocking member having an engaged position when said latch bolt is in said first orientation and an unengaged position when said latch bolt is in said second orientation; and c) a blocking element coupled to said blocking member and moveable between a blocking position and an unblocking position, wherein said blocking member is in said engaged position when said blocking element is in said blocking position, and said blocking member is in said unengaged position when said blocking element is in said unblocking position.

18. The electric locking device in accordance with claim 17 further including an actuator coupled to said blocking element and configured to selectively move said blocking element from said blocking position to said unblocking position.

19. The electric locking device in accordance with claim 15 wherein said inhibitor further includes an inhibitor spring configured to bias said inhibitor to said coupled position.

20. The electric locking device in accordance with claim 10 wherein said keeper includes a biasing member configured to bias said keeper toward said first directional position.

21. The electric locking device in accordance with claim 10 wherein said shaft axis of rotation is configured to move linearly relative to said lock housing as said keeper moves between said first directional position and said second directional position.

22. An electric locking device for selectively locking and unlocking a door to a door frame, the door being pivotally coupled to the door frame, the electric locking device comprising:

a) a lock housing configured to be mounted to said door frame; and b) a keeper movably connected to said housing, wherein said keeper includes a keeper shaft having a shaft axis of rotation, i) wherein said keeper is rotatable about said shaft axis of rotation between a first rotational position and a second rotational position, ii) wherein said keeper is also movable linearly between a first directional position and a second directional position relative to said lock housing, and wherein said shaft axis of rotation is configured to move relative to said lock housing as said keeper moves between said first directional position and said second directional position, iii) wherein when said keeper is in said first rotational position and said first directional position, said door is secured to said door frame by said keeper, and iv) wherein when said keeper is in said second rotational position and said second directional position, said door is allowed to move away from said door frame.

23. The electric locking device in accordance with claim 22 wherein said shaft axis of rotation is configured to move linearly relative to said lock housing as said keeper moves between said first directional position and said second directional position.

* * * * *